United States Patent
Pan et al.

(10) Patent No.: US 12,088,180 B2
(45) Date of Patent: Sep. 10, 2024

(54) KINETIC ENERGY-HARVESTING DEVICE FOR POWERING AND CHARGING RAILWAY AND OTHER APPLICATIONS

(71) Applicant: VIRGINIA TECH INTELLECTUAL PROPERTIES, INC., Blacksburg, VA (US)

(72) Inventors: Yu Pan, Blacksburg, VA (US); Lei Zuo, Blacksburg, VA (US); Mehdi Ahmadian, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 189 days.

(21) Appl. No.: 17/719,971

(22) Filed: Apr. 13, 2022

(65) Prior Publication Data

US 2022/0337124 A1    Oct. 20, 2022

Related U.S. Application Data

(60) Provisional application No. 63/174,859, filed on Apr. 14, 2021.

(51) Int. Cl.
*H02K 7/18* (2006.01)
*E01B 26/00* (2006.01)
*H02J 7/00* (2006.01)

(52) U.S. Cl.
CPC .......... *H02K 7/1861* (2013.01); *E01B 26/00* (2013.01); *H02J 7/0042* (2013.01)

(58) Field of Classification Search
CPC ...... H02K 7/1853; H02K 7/06; H02K 7/1861; E01B 26/00; E01B 3/00; H02J 7/0042; H02J 7/32; H02J 50/001
See application file for complete search history.

(56) References Cited

U.S. PATENT DOCUMENTS 7,812,508 B2 * 10/2010 Abramovich ............ H02N 2/18
                                                                    310/339
2016/0020671 A1 *  1/2016 Rastegar ............... H02K 7/1853
                                                                    290/1 E

OTHER PUBLICATIONS

A half-wave electromagnetic energy-harvesting tie towards safe and intelligent rail transportation Y Pan, L Zuo, M Ahmadian, Applied Energy 313, 118844, 2022.
(Continued)

*Primary Examiner* — Michael C Zarroli
(74) *Attorney, Agent, or Firm* — Perilla Knox & Hildebrandt; Jason M. Perilla

(57) ABSTRACT

A kinetic energy harvesting device implementing a half-wave mechanical motion rectification (HMMR) mechanism is described. The energy harvesting device may include an energy harvesting railroad tie, where the tie includes a tie housing configured to be coupled to at least one rail. The tie housing includes at least one spring and at least one energy harvester. The at least one energy harvester includes a generator having an output shaft, a gearhead, a ball screw or other motion transmission, and a one-way clutch. Under a force of a passing wheel on the at least one rail, the at least one energy harvester is compressed, which causes a rotation of the ball screw or other motion transmission, a rotation of the output shaft, and a transmission of torque to a shaft of the gearhead, driving the generator in a unidirectional rotation to generate electrical power via the one-way clutch.

18 Claims, 13 Drawing Sheets

(56) References Cited

OTHER PUBLICATIONS

Bowness D, Lock AC, Powrie W, Priest JA, Richards DJ. Monitoring the dynamic displacements of railway track. Proc Inst Mech Eng, Part F: J Rail Rapid Transit 2007;221(1):13-22.

Cahill P, Nuallain Nan, Jackson N, Mathewson A, Karoumi R, Pakrashi V. Energy harvesting from train-induced response in bridges. J Bridge Eng 2014; 19(9): 04014034. https://doi.org/10.1061/(ASCE)BE.1943-5592.0000608.

Farritor S, Arnold R, Lu S, Hogan C. Real-time vertical track modulus measurement system from a moving railcar. Research Results, Federal Railroad Administration, RR06-08; 2006.

Gao M, Su C, Cong J, Yang F, Wang Y, Wang P. Harvesting thermoelectric energy from railway track. Energy. 2019;180:315-29.

Gao M, Wang P, Cao Y, Chen R, Cai D. Design and verification of a rail-borne energy harvester for powering wireless sensor networks in the railway industry. IEEE Trans Intell Transp Syst 2017; 18:1596-609.

Gao MY, Wang P, Cao Y, Chen R, Liu C. A rail-borne piezoelectric transducer for energy harvesting of railway vibration. J vibroeng. 2016; 18(7):4647-63.

Guo S, Liu Y, Xu L, Guo X, Zuo L. Performance evaluation and parameter sensitivity of energy-harvesting shock absorbers on different vehicles. Veh Syst Dyn 2016;54 (7):918-42.

Hao D, Zhang T, Guo L, Feng Y, Zhang Z, Yuan Y. A high-efficiency, portable solar energy-harvesting system based on a foldable-wings mechanism for self-powered applications in railways. Energy Technol 2021;9(4):2000794. https://doi.org/10.1002/ente.v9.410.1002/ente.202000794.

Hou W, Li Y, Guo W, Li J, Chen Y, Duan X. Railway vehicle induced vibration energy harvesting and saving of rail transit segmental prefabricated and assembling bridges. J Cleaner Prod 2018; 182:946-59.

Kuang Y, Chew ZJ, Ruan T, Lane T, Allen B, Nayar B, et al. Magnetic field energy harvesting from the traction return current in rail tracks. Appl Energy 2021;292: 116911. https://doi.org/10.1016/j.apenergy.2021.116911.

Li Z, Zuo L, Kuang J, Luhrs G. Energy-harvesting shock absorber with a mechanical motion rectifier. Smart Materials and Structures. 2013;22:025008.

Lin T, Pan Y, Zuo L. Dynamics Modeling of Train-Track- Harvester System and In-Field Testing of Railroad Energy Harvester. ASME 2016 Dynamic Systems and Control Conference2016. p. V001T13A-VT13A.

Lin T, Pan Yu, Chen S, Zuo L. Modeling and field testing of an electromagnetic energy harvester for rail tracks with anchorless mounting. Appl Energy 2018;213: 219-26.

Lin T, Wang JJ, Zuo L. Efficient electromagnetic energy harvester for railroad transportation. Mechatronics 2018;53:277-86.

Liu Y, Xu L, Zuo L. Design, modeling, lab, and field tests of a mechanical-motionrectifier- based energy harvester using a ball-screw mechanism. IEEE/ASME Trans Mechatron 2017;22(5): 1933-43.

Nagode C, Ahmadian M, Taheri S. Axle generator for freight car electric systems. ASME Joint Rail Conference 2012. p. 761-5.

Nagode C, Ahmadian M, Taheri S. Vibration-based energy harvesting systems for on-board applications. ASME Joint Rail Conference 2011. p. 333-7.

Pan H, Li H, Zhang T, Laghari AA, Zhang Z, Yuan Y, et al. A portable renewable wind energy harvesting system integrated S-rotor and H-rotor for self-powered applications in high-speed railway tunnels. Energy Convers Manage 2019;196: 56-68.

Pan Y, Liu F, Jiang R, Tu Z, Zuo L. Modeling and onboard test of an electromagnetic energy harvester for railway cars. Applied Energy. 2019;250:568-81.

Pan Yu, Lin T, Qian F, Liu C, Yu J, Zuo J, et al. Modeling and field-test of a compac electromagnetic energy harvester for railroad transportation. Appl Energy 2019; 247:309-21.

Peigney M, Siegert D. Piezoelectric energy harvesting from traffic-induced bridge vibrations. Smart Materials and Structures. 2013;22:095019.

Penamalli GR. Structural health monitoring and energy harvesting for railroad [Master's Thesis]. State University of New York at Stony Brook; 2011.

Pourghodrat A, Nelson CA, Hansen SE, Kamarajugadda V, Platt SR. Power harvesting systems design for railroad safety. Proc Inst Mech Eng, Part F: J Rail Rapid Transit 2014;228(5):504-21.

Pourghodrat A. Energy harvesting systems design for railroad safety [Master's Thesis]. University of Nebraska Lincoln; 2011.

Sun Y, Wang P, Lu J, Xu J, Wang P, Xie S, et al. Rail corrugation inspection by a self-contained triple-repellent electromagnetic energy harvesting system. Appl Energy 2021;286:116512. https://doi.org/10.1016/j. apenergy.2021.116512.

Track Safety Standards Compliance Manual. U.S. Department of Transportation, Federal Railroad Administration; 2019.

Train Accidents by Type and Major Cause. U.S. Department of Transportation, Federal Railroad Administration, Office of Safety Analysis; 2021.

Transportation Statistics Annual Report 2020. U.S. Department of Transportation, Bureau of Transportation Statistics; 2020.

Vorster J, Grabe H. Axle load and track deflection on a heavy haul line. Civil Eng: Mag South African Inst Civil Eng. 2010;18:44-9.

Wang H, Jasim A, Chen X. Energy harvesting technologies in roadway and bridge for different applications - A comprehensive review. Applied Energy. 2018;212:1083-94.

Wang J, Lin T, Zuo L. High efficiency electromagnetic energy harvester for railford application. In: ASME 2013 International Design Engineering Technical Conferences and Computers and Information in Engineering Conference; 2013. p. V004T08A37-VT08A37.

Wang JJ, Penamalli G, Zuo L. Electromagnetic energy harvesting from train induced railway track vibrations. In: Proceedings of IEEE/ASME International Conference on Mechatronic and Embedded Systems and Applications; 2012. p. 29-34.

Wang Y, Zhu X, Zhang T, Bano S, Pan H, Qi L, Zhang Z, Yuan Y. A renewable low-frequency acoustic energy harvesting noise barrier for high-speed railways using a Helmholtz resonator and a PVDF film. Applied Energy. 2018;230:52-61.

Wischke M, Masur M, Kroner M, Woias P. Vibration harvesting in traffic tunnels to power wireless sensor nodes. Smart Mater Struct 2011;20(8):085014. https://doi. org/10.1088/0964-1726/20/8/085014.

Xiong H, Wang L. Piezoelectric energy harvester for public roadway: On-site installation and evaluation. Applied Energy. 2016; 174:101-7.

Yuan T, Yang J, Song R, Liu X. Vibration energy harvesting system for railroad safety based on running vehicles. Smart Materials and Structures. 2014;23:125046.

Zhang X, Zhang Z, Pan H, Salman W, Yuan Y, Liu Y. A portable high-efficiency electromagnetic energy harvesting system using supercapacitors for renewable energy applications in railroads. Energy Convers Manage 2016;118:287- 94.

* cited by examiner

Transmission when a wheelset approaches and one-way clutch engages

Transmission when a wheelset leaves and one-way clutch disengages

KINETIC ENERGY-HARVESTING DEVICE FOR POWERING AND CHARGING RAILWAY AND OTHER APPLICATIONS

CROSS-REFERENCE TO RELATED APPLICATION

This application claims the benefit of and priority to U.S. Provisional Patent Application No. 63/174,859 filed Apr. 14, 2021, entitled "RAILROAD ENERGY-HARVESTING TIE FOR POWERING AND CHARGING RAILWAY APPLICATIONS," the contents of which being incorporated by reference in their entirety herein.

BACKGROUND

Railroads are an energy-efficient way of transporting people and goods with respect to limiting greenhouse gas emissions, increasing fuel efficiency, and reducing carbon footprint. A significant portion of railroad tracks are located in rural areas where manual track inspection is not convenient which, at times, generates safety concerns arising out of unnoticed track issues and makes having an abundant network of railroad sensors difficult or impossible. For railroad sections located in rural areas and tunnels, electric power is generally inaccessible or very expensive. Traditional trackside electrical auxiliary devices that can increase rail operational safety and reliability, such as signal lights, hotbox detectors, wireless communications, rail health monitoring systems and track switches, are unable to be economically deployed in rural areas. Even though diesel engines, batteries, solar panels, and the like can provide power, frequent fuel refilling, battery replacement, inconsistent weather, and the like make these solutions less than ideal. Therefore, it is desirable to have a reliable and sustainable power source for trackside electrical applications, which may improve operational safety and connectivity.

BRIEF SUMMARY

Various embodiments are disclosed for a kinetic energy-harvesting device. In some implementations, a kinetic energy-harvest device includes a railroad energy-harvesting tie for powering and charging railway applications. In a first aspect, an energy harvesting railroad tie implementing a half-wave mechanical motion rectification (HMMR) mechanism is disclosed, comprising: a tie housing configured to be coupled to at least one rail, comprising: at least one spring; and at least one energy harvester comprising a generator, such as but not limited to an electrical, electromagnetic, triboelectric, or similar generator, having an output shaft, a gearhead, a ball screw, and a one-way clutch. When under a force of a passing wheel on the at least one rail, the at least one energy harvester is compressed, wherein a compression of the at least one energy harvester causes a rotation of the ball screw, a rotation of the output shaft, and a transmission of torque to a shaft of the gearhead, driving the generator to generate electrical power via the one-way clutch. When the force of the passing wheel on the at least one rail has dissipated, the at least one spring causes the energy harvesting railroad tie to return to the original state, causing the ball screw and output shaft to rotate, the one-way clutch to disengage from the output shaft, and disconnect the generator from the gearhead.

In some aspects, the at least one rail is a first rail and a second rail; the at least one energy harvester is a first energy harvester disposed at a first side of the energy harvesting railroad tie and a second energy harvester disposed at a second side of the energy harvesting railroad tie, the first energy harvester configured to harvest kinetic energy from the first rail and the second energy harvester is configured to harvest kinetic energy from the second rail; and the at least one spring is a plurality of springs. A number of the plurality of springs may be between two and eight (e.g., four, six, and so forth). The one-way clutch may be an only one-way clutch of the at least one energy harvester.

The energy harvesting railroad tie may further include a battery electrically coupled to the at least one energy harvester, the at least one energy harvester being configured to charge the battery when the at least one rail is under deformation. The at least one energy harvester may be rigidly connected to the energy harvesting tie at a top of the at least one energy harvester and a tie box at a bottom of the at least one energy harvester. The energy harvesting railroad tie may further include processing circuitry configured to generate at least one measurement associated with the at least one rail, and communicate the at least one measurement or store the at least one measurement in a storage device.

In a second aspect, a method for generating electrical power using a half-wave mechanical motion rectification mechanism that is coupled to at least one rail, at least one spring; and at least one energy harvester comprising a generator, such as but not limited to electrical, electromagnetic, triboelectric, or similar embodiment, having an output shaft, a gearhead, a ball screw, and a one-way clutch enclosed in a railroad tie. The method includes, under a force of a passing wheel on the at least one rail, compressing the at least one energy harvester, wherein the compressing of the at least one energy harvester causes a rotation of the ball screw, a rotation of the output shaft, and a transmission of torque to a shaft of the gearhead, driving the generator to generate electrical power via the one-way clutch. The method further includes, when the force of the passing wheel on the at least one rail has dissipated, directing, by the at least one spring, the energy harvesting railroad tie to return to an undeflected state, causing the ball screw and output shaft to rotate, the one-way clutch to disengage from the output shaft, and disconnect the generator from the gearhead.

In a third aspect, an energy harvesting railroad tie implementing a half-wave mechanical motion rectification that is coupled to at least one rail, at least one spring; and at least one energy harvester comprising a generator, such as but not limited to electrical, electromagnetic, or triboelectric, having an output shaft, a gearhead, a ball screw, and a one-way clutch enclosed in a railroad tie. When under a force of passing wheels on the first rail and the second rail, the first and second energy harvesters are compressed, wherein a compression of the first and second energy harvesters causes a rotation of the ball screw, a rotation of the output shaft, and a transmission of torque to a shaft of the gearhead, driving the generator to generate electrical power via the one-way clutch. When the force of the passing wheel on the first rail and the second rail has dissipated, the plurality of springs cause the energy harvesting railroad tie to return to an undeflected state, causing the ball screw and output shaft of the first and second energy harvester to rotate, the one-way clutch to disengage from the output shaft, and disconnect the generator from the gearhead.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
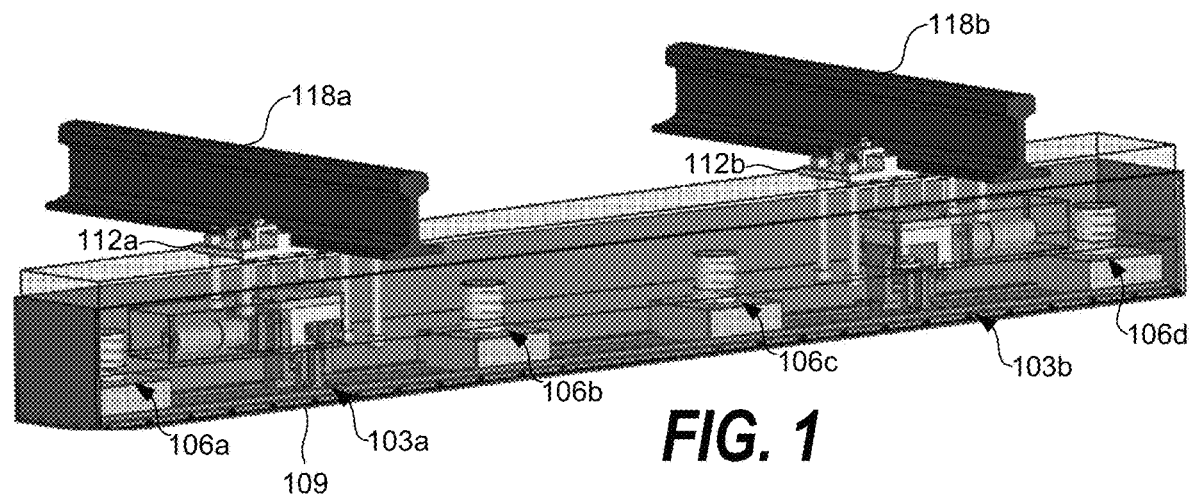
FIG. 1 is a perspective cross-section view of an energy harvesting tie for use in a railway application according to various embodiments of the present disclosure.

The present disclosure relates to an energy-harvesting device for powering and charging various applications. In some embodiments, the energy harvesting railroad device implements a half-wave mechanical motion rectification mechanism. As such, the energy harvesting device may include, for example, a housing configured to be coupled to a surface. The housing may include, for example, means for resisting force and returning a state of the housing to a non-compressed state as well as means for translating force applied to the surface from a first direction (e.g., a vertical direction) to force in a second direction (e.g., a horizontal direction).

Specifically, in some embodiments, an energy harvesting railroad tie implementing a half-wave mechanical motion rectification mechanism is disclosed. The energy harvesting railroad tie may include, for example, a tie housing configured to be coupled to at least one rail. The tie housing may include, for example, at least one spring and at least one energy harvester. The at least one energy harvester may include an output shaft, a gearhead, a ball screw, and a one-way clutch, as well as other components as will be described.

When under a force of a passing wheel on the at least one rail, the at least one energy harvester is compressed. A compression of the at least one energy harvester causes a rotation of the ball screw, a rotation of the output shaft, and a transmission of torque to a shaft of the gearhead, driving the generator to generate electrical power via the one-way clutch. When the force of the passing wheel on the at least one rail has dissipated, the at least one spring causes the energy harvesting railroad tie to return to an undeflected state, causing the ball screw and output shaft to rotate, the one-way clutch to disengage from the output shaft, and disconnect the generator from the gearhead.

In some embodiments, the at least one rail is a first rail and a second rail. Further, in various embodiments, the at least one energy harvester is a first energy harvester disposed at a first side of the energy harvesting railroad tie and a second energy harvester disposed at a second (and different) side of the energy harvesting railroad tie. As such, the first energy harvester may be configured to harvest kinetic energy from the first rail and the second energy harvester may be configured to harvest kinetic energy from the second rail. Further, the at least one spring is a plurality of springs. A number of the plurality of springs may be between two and eight (e.g., four, six, and so forth). The one-way clutch may be a single one-way clutch of the at least one energy harvester (e.g., a single one-way clutch per energy harvester).

The energy harvesting railroad tie may further include a battery electrically coupled to the at least one energy harvester, where the at least one energy harvester is configured to charge the battery when the at least one rail is under compression or shortly thereafter. The at least one energy harvester may be rigidly connected to the energy harvesting tie at a top of the at least one energy harvester and a tie box at a bottom of the at least one energy harvester. The energy harvesting railroad tie may further include processing circuitry configured to generate at least one measurement associated with the at least one rail, and communicate the at least one measurement or store the at least one measurement in a storage device.

Figure 2:
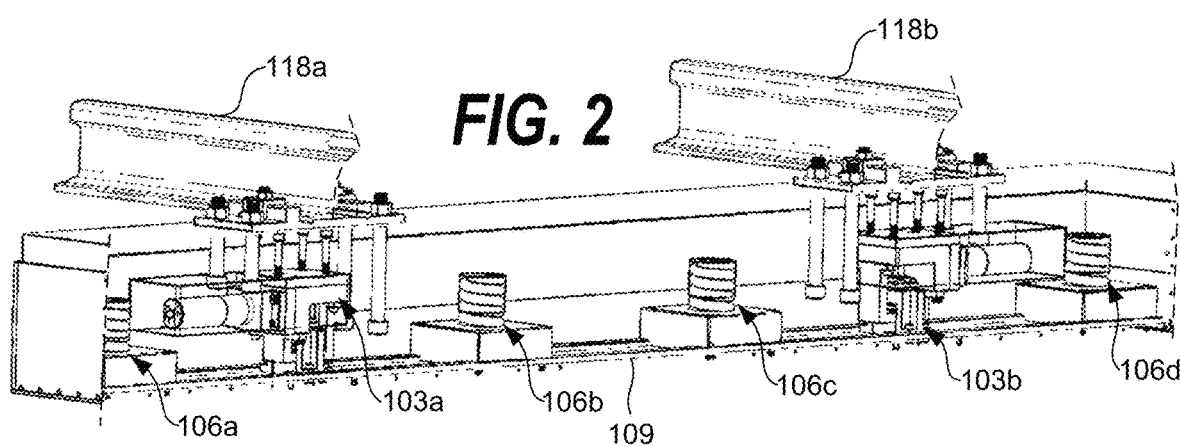
FIG. 2 is another perspective cross-section view of the energy harvesting tie of FIG. 1 according to various embodiments of the present disclosure.
Figure 3:
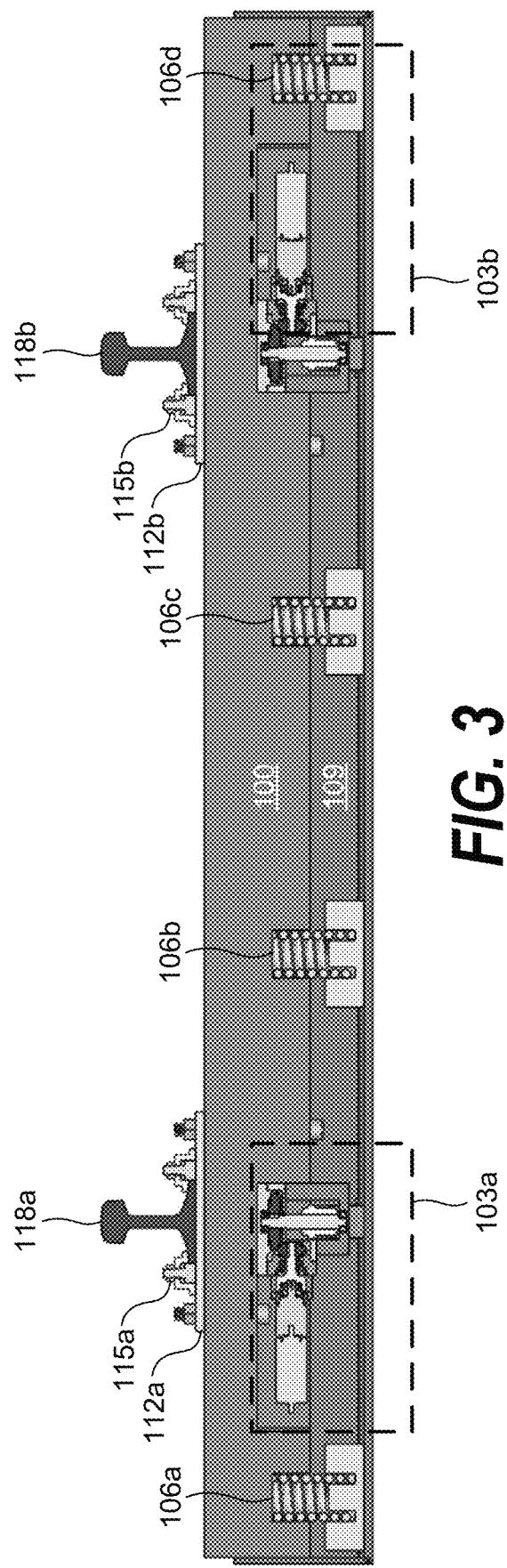
FIG. 3 is a side cross-section view of the energy harvesting tie of FIG. 1 as installed on a rail track according to various embodiments of the present disclosure.
Figure 4:
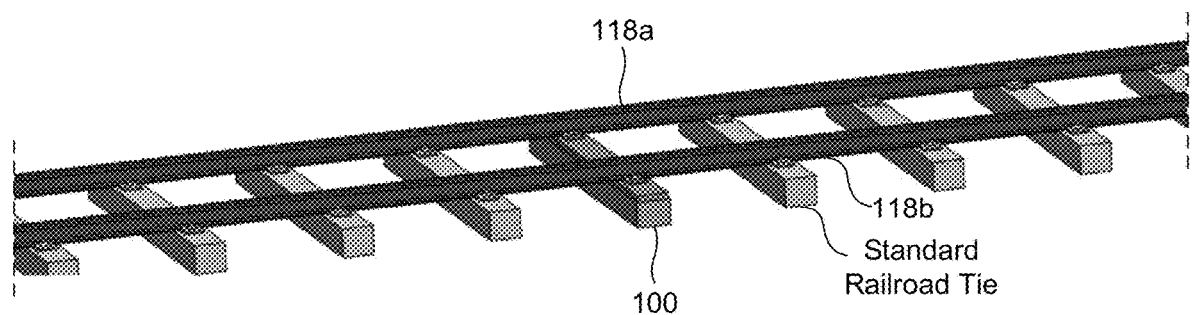
FIG. 4 is an example of a railway application having the energy harvesting tie of FIG. 1 according to various embodiments of the present disclosure.
Figure 5:
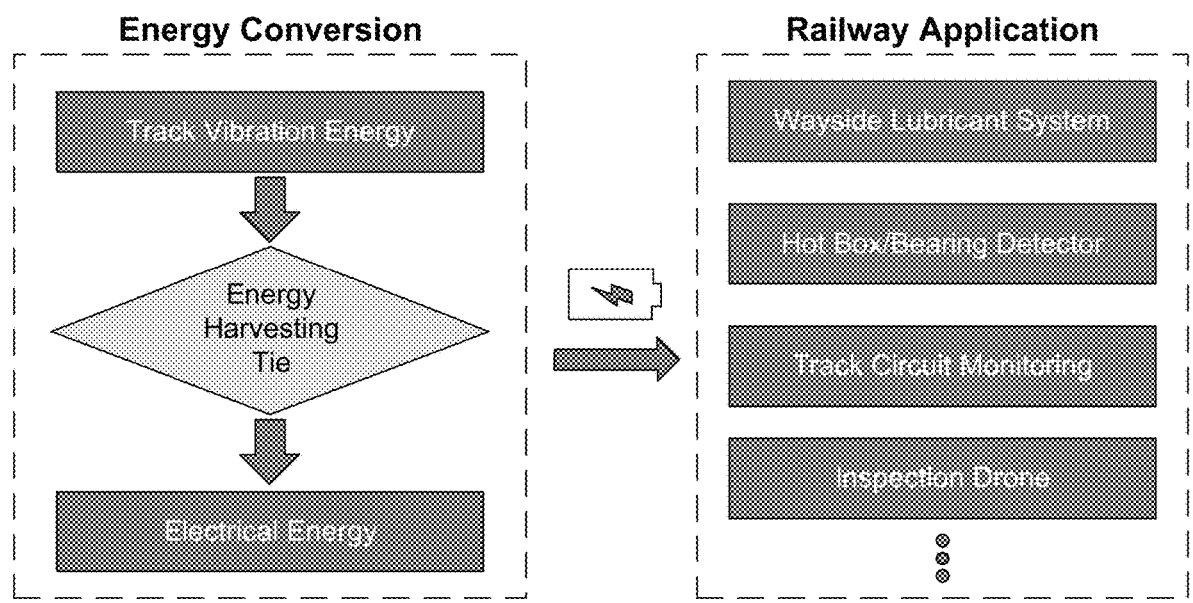
FIG. 5 is a schematic diagram illustrating various example railway applications that may be powered by the energy harvesting tie of FIG. 1 according to various embodiments of the present disclosure.

Turning now to the design drawings, FIGS. 1-3 show non-limiting examples of an energy harvesting tie 100 according to various embodiments. The energy harvesting tie 100 may include standard railroad tie dimensions having one or more cavities (e.g., machined spaces) for at least one energy harvester 103 and at least one spring 106 (e.g., a preloaded coil spring). The at least one spring 106 may be means for returning the energy harvesting tie 100 or other energy harvesting device to a non-compressed or non-deformed state. As such, the energy harvesting tie may include a length of 102 inches, a width of nine inches, and a height of seven inches, ±10 percent, although other dimensions may be employed. In the non-limiting example of FIGS. 1-3, the energy harvesting tie 100 includes two energy harvesters 103a, 103b and four preloaded coil springs 106a . . . 106d. It is understood, however, that other numbers of energy harvesters 103 and/or springs 106 may be employed, for instance, based on a desired application or output specification. The energy harvester 103 may also be referred to simple as an energy harvester or electrical harvester, as may be appreciated.

The energy harvesting tie 100 may further include a tie box 109 that provides base support. The energy harvesters 103 may be positioned inside one or more cavities of the energy harvesting tie 100, thereby protecting the energy harvesters 103 from harsh railroad environments. In various embodiments, the energy harvesters 103 may be rigidly connected to the energy harvesting tie 100 from the top and the tie box 109 from the bottom. Tie plates 112a, 112b and clips-and-fasteners 115a, 115b may be employed to clamp the energy harvesting tie 100 to rails 118a, 118b (e.g., left rail 118a and right rail 118b). The energy harvesting railroad tie 100 or other device may be disposed predominantly below a surface, such as the rails 118a, 118b. The energy harvesting railroad device (e.g., the portion of the device configured to capture kinetic energy, such as the energy harvester 103) may be disposed predominantly below or within the energy harvesting railroad tie 100.

Generally, relative movement between the energy harvesting tie 100 and the tie box 109 caused by a traveling train wheel or other movement may induce high-speed rotation of the energy harvesters 103, thereby producing energy. In some embodiments, energy is produced in the range of tens of Watts. A bending of the rails 118 and the springs 106 return the energy harvesting tie 100 to an undeflected position when not under a direct wheel load (e.g., when a train is no longer above or near the energy harvesting tie 100). To this end, the energy harvesting tie 100 may be used on both ballasted and unballasted tracks, although ballasted tracks may yield more energy in some embodiments due to larger vertical deflections imposed caused by heavier wheel loads. It is understood that the energy harvesting tie 100 may include a battery or other power storage mechanism that may be charged by the energy harvester 103. As such, power of the battery may be accessed using a 5 V, 120 V, or other outlet as desired per application.

Figure 6:
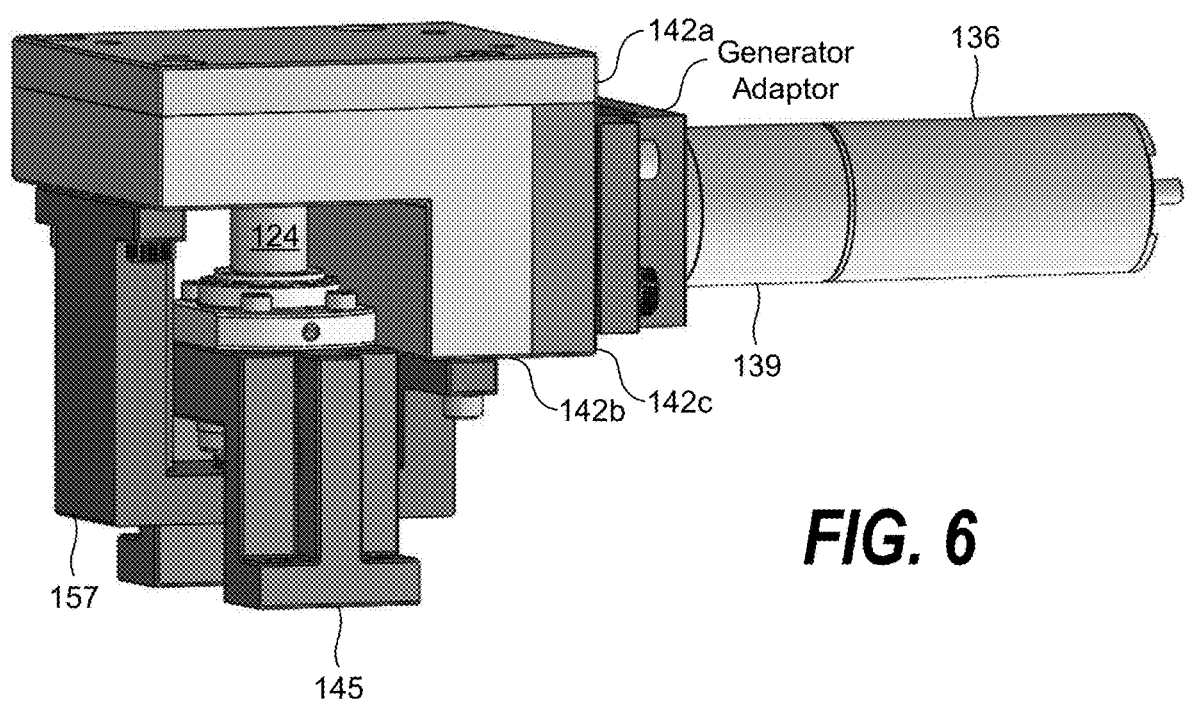
FIG. 6 is a perspective view of an energy harvester of the energy harvesting tie of FIG. 1 according to various embodiments of the present disclosure.
Figure 7:
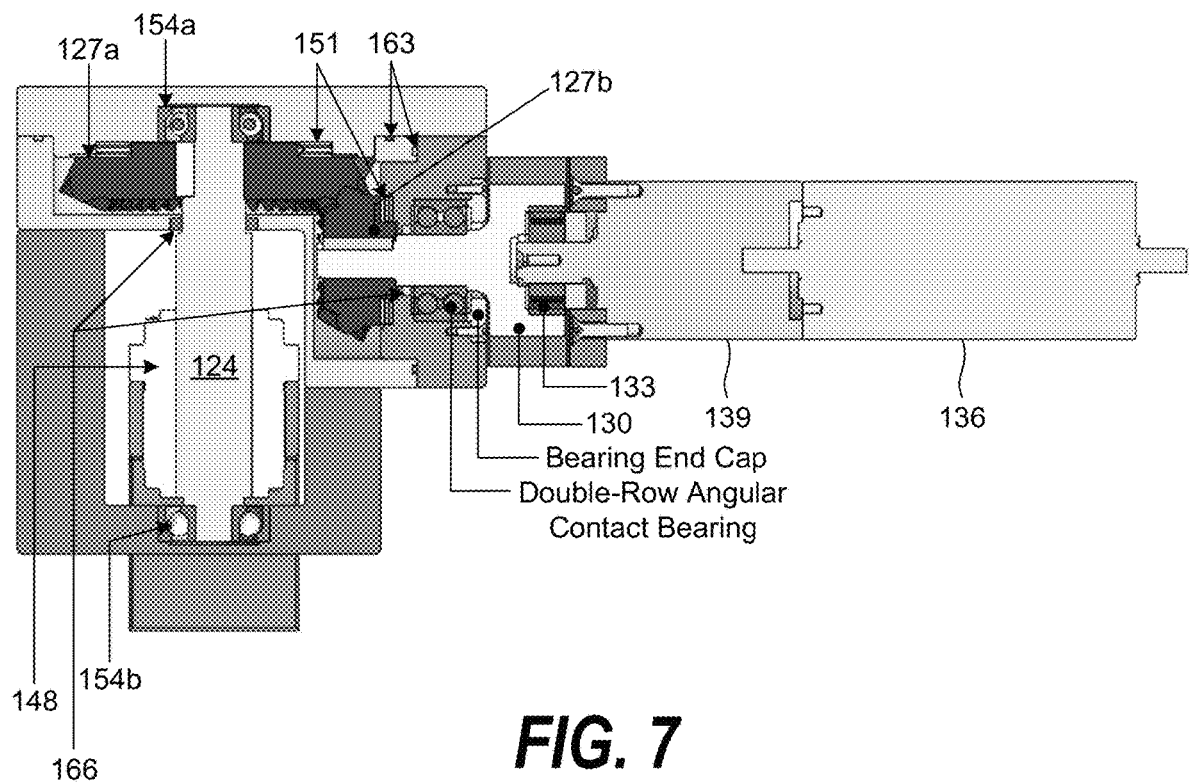
FIG. 7 is a side cross-section view of an energy harvester of the energy harvesting tie of FIG. 1 according to various embodiments of the present disclosure.

Moving along to FIGS. 6 and 7, a perspective view and a side view of an example of an energy harvester 103 are shown, respectively, according to various embodiments. The energy harvester 103 may include, for example, means for translating a force applied to a surface (e.g., the rails 118a and/or 118b) from a first direction (e.g., a vertical direction) to a second direction (e.g., a horizontal direction) to drive a generator, as will be described. For instance, the means for translating the force from the first direction to a second direction may include a ball screw 124 (e.g., a back-driven ball screw 124), an enclosed gearbox with at least one bevel gear 127 (e.g., a pair of bevel gears 127), and/or an output shaft 130 with a one-way clutch 133. The energy harvester 103 may further include a generator 136 with a speed-increasing gearhead 139, as illustrated in FIG. 7. In various embodiments, the generator 136 may include, for example, an electrical, electromagnetic, triboelectric, and/or similar generator, or a combination thereof. A top casing of the enclosed gearbox, referred to as a first casing 142a, may be rigidly connected to the energy harvesting tie 100 via fasteners. A nut adapter 145 may be U-shaped, for example, and may be rigidly connected to a ball nut 148 that may be bolted on a base plate of the tie box 109. The energy harvesting tie 100 may rest, for example, on a tamped ballast (e.g., on a ballasted track) or a subgrade (e.g., on a ballast-less track).

With four springs 106, for example, the tie box 109 is relatively stationary. The energy harvesting tie 100 follows rail deflection due to vibrations and pressures induced by a wheel of a train, which causes the casings and ball screw 124 to move up and down vertically while the ball nut 148 attached to the tie box 109 remains stationary. Relative reciprocating linear motion between the energy harvesting tie 100 and the tie box 109 is transformed into a bidirectional rotation of a shaft of the ball screw 124 which rotates a shaft of the generator 136 through the gearbox.

In some embodiments, the gearbox may include a pair of bevel gears 127a, 127b, two thrust bearings 151, two angular contact bearings 154a, 154b, and outer casing (e.g., first, second, and third outer casings 142a . . . 142c). It is understood, however, that other numbers of these components may be employed depending on a particular application. A supporting structure, referred to as a bearing casing 157, may hold an angular contact bearing 154 to support the ball screw 124 from the bottom. The bidirectional rotation of the ball screw 124 drives the bevel gears 127, and subsequently, the output shaft 130 rotates in two directions.

In some embodiments, instead of being integrated with a larger one of the bevel gears 127a, the one-way clutch 133 may be placed at an output end so that torque requirements and associated friction can be reduced. An outer ring of the one-way clutch 133 may be press-fitted into a bore of the output shaft 130 and its inner ring may include a keyway that can transmit torque from the output shaft 130 to the gearhead 139 in one direction. Consequently, the generator 136 can be driven unidirectionally at a relatively high speed. O-ring grooves 163 and shaft seals 166 may be employed to seal the gearbox.

Figure 8:
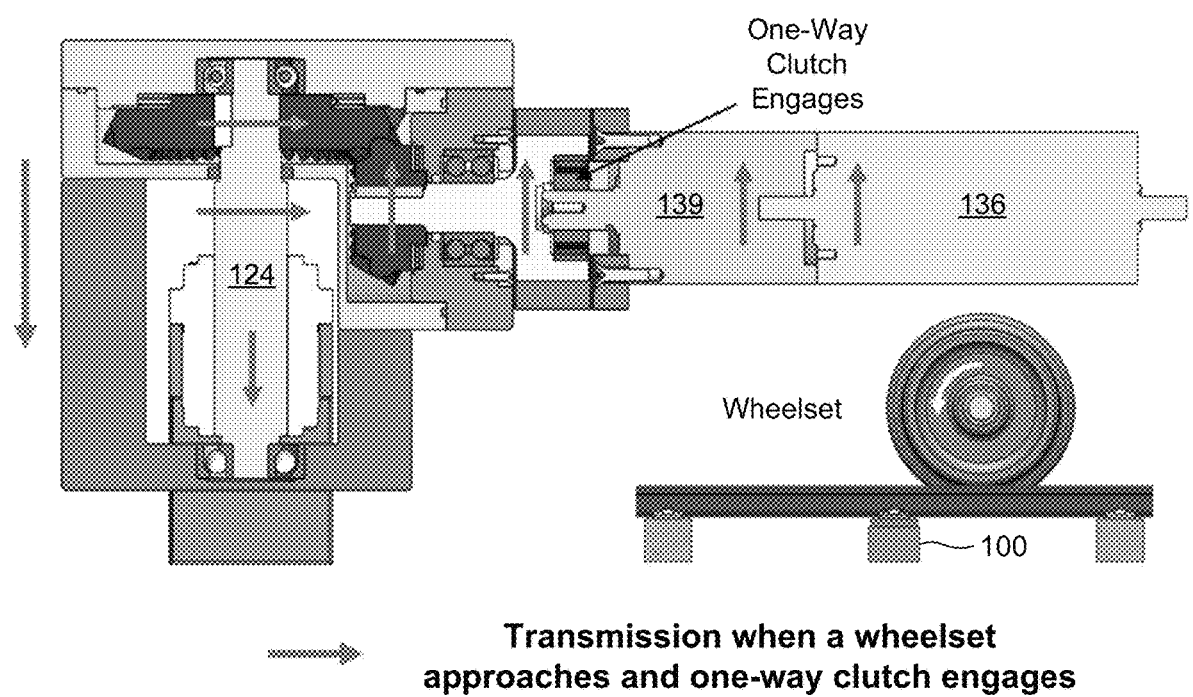
FIG. 8 illustrates downward track motion being transmitted and converted into generator rotation where the arrows show the direction of motion in response to track deflection due to a passing wheel according to various embodiments of the present disclosure.
Figure 9:
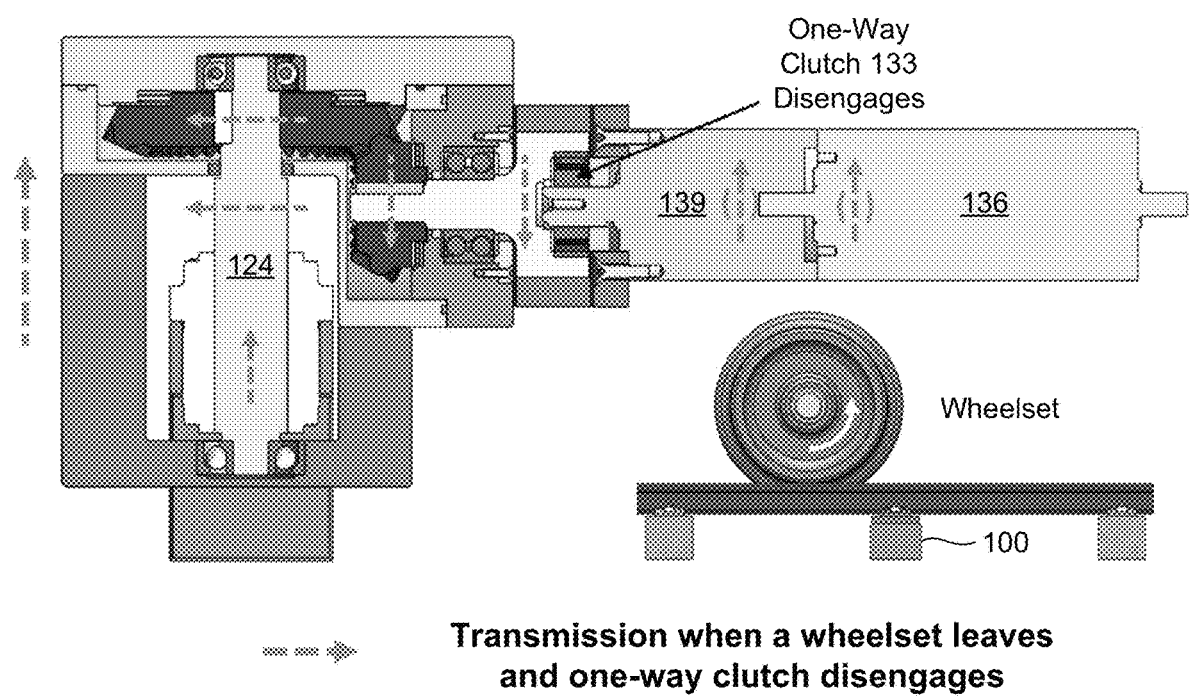
FIG. 9 illustrates downward track motion being transmitted and converted into generator rotation where the arrows represent the motion in rebound to return to undeflected position according to various embodiments of the present disclosure.
Figure 10:
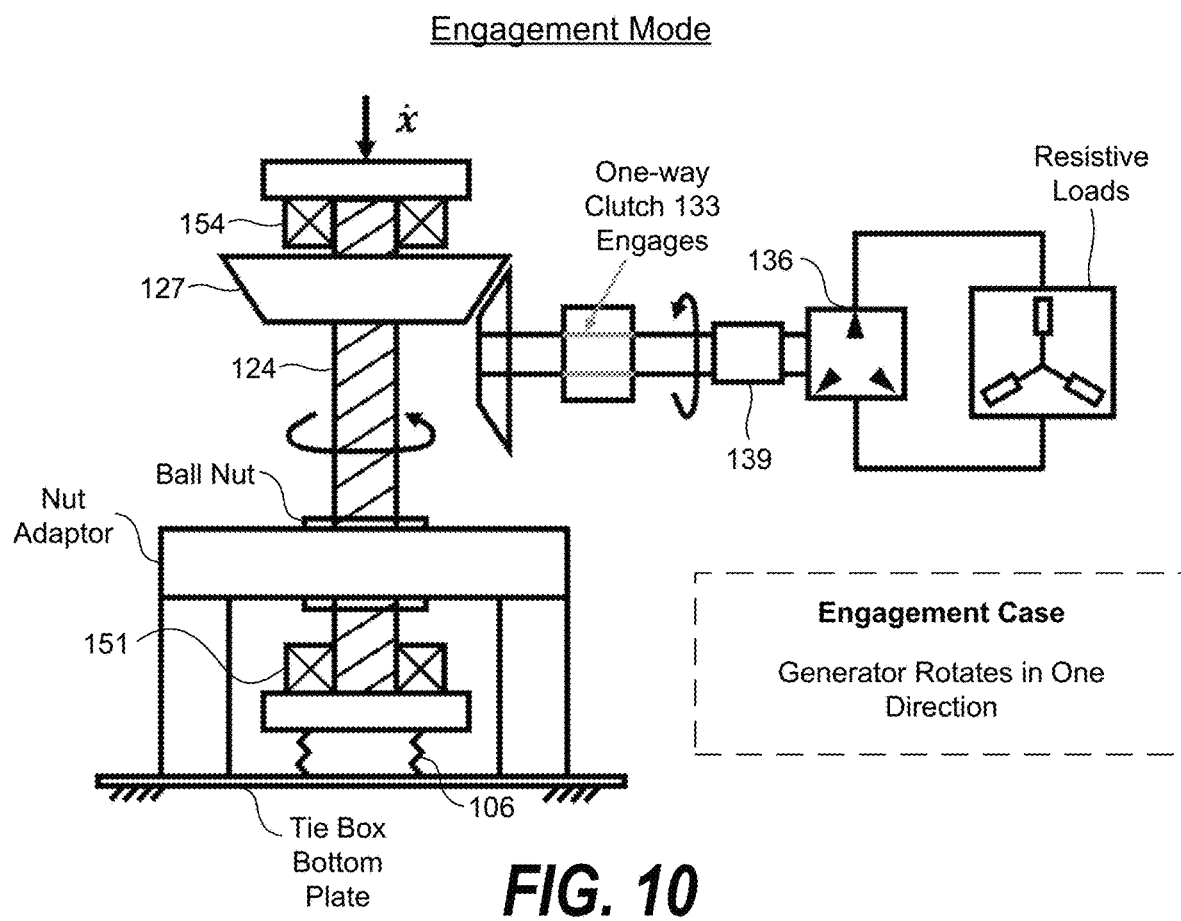
FIG. 10 is a schematic diagram of the energy harvesting tie for a single rail in an engagement mode in which a one-way clutch is engaged according to various embodiments of the present disclosure.
Figure 11:
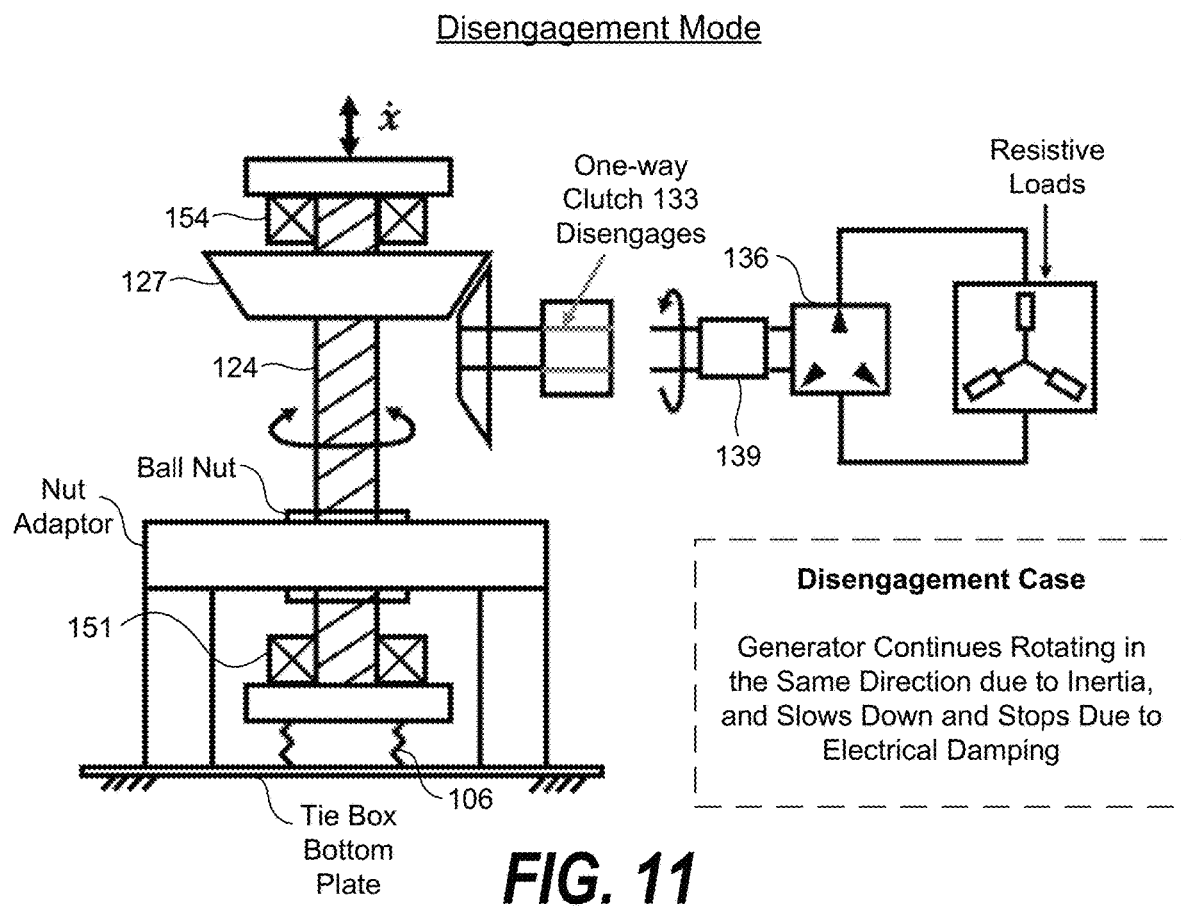
FIG. 11 is a schematic diagram of the energy harvesting tie for a single rail in a disengagement mode in which a one-way clutch is disengaged according to various embodiments of the present disclosure.
Figure 12:
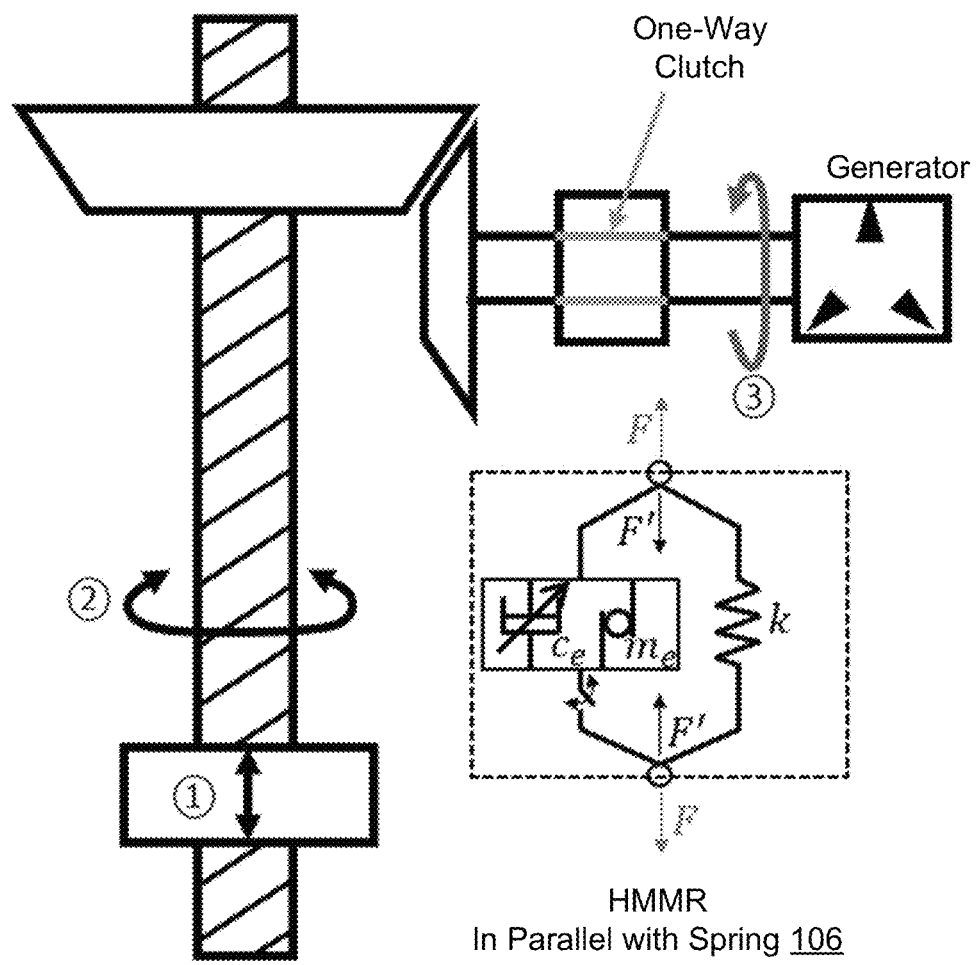
FIG. 12 illustrates an example half-wave mechanical motion rectification (HMMR) mechanism and its model coupled with a preloaded return spring according to various embodiments of the present disclosure.

Moving along to FIGS. 8 and 9, FIGS. 8 and 9 demonstrate the working principle of motion transmission of the energy harvester 103. The arrows in FIG. 8 represent direction of movement when a wheel approaches (e.g., a train wheel), while the arrows in FIG. 9 show the return to an undeflected position. Under the force of a passing wheel, the energy harvesting tie 100 moves downward with a small amplitude, and the energy harvester 103 positioned between the energy harvesting tie 100 and the tie box 109 is compressed. This low-speed linear compression is translated into rotation of the ball screw 124 and the pair of bevel gears 127, thereby rotating the output shaft 130 at a high speed. The engaged one-way clutch 133 transmits torque and motion to the shaft of the gearhead 139, driving the generator 136 at a relatively high speed to generate electrical power.

In rebound, the bending rails 118 and springs 106 return the energy harvesting tie 100 to the undeflected position, driving the ball screw 124, bevel gears 127, and output shaft 130 to rotate in the opposite direction. The one-way clutch 133 is disengaged from the shaft of the gearhead 139 in the rebound, disconnecting the generator 136 from the gearbox. The generator 136 can continue spinning with momentum and electrical damping; however, the generator 136 does not receives additional torque until a next compression cycle of the energy harvesting tie 100.

As opposed to the related art, various embodiments of the energy harvesting tie 100 disclosed herein employ a single one-way clutch 133 that allows harvesting energy in a compression cycle only. This is analogous to a half-wave electrical rectifier in the electrical domain, referred to herein as half-wave mechanical motion rectification (HMMR). The HMMR mechanism enables huge spring loads required in rebound cycles of bidirectional track harvesters to be avoided. As such, the various embodiments described herein not only eliminate large preload and installation challenges, but also create more room and flexibility for optimizing performance. Table 1 lists example parameters of the energy harvesting tie 100.

TABLE 1

| Parameters | Value | Description |
| --- | --- | --- |
| $d_s$ | 25.44 mm | Ball screw stroke |
| $d_m$ | 25 mm | Ball screw shaft |
| l | 25 mm | Ball screw lead |
| $J_{bs}$ | 0.43 kgcm² | Ball screw shaft inertia |
| $J_{lb}$ | 4.73 kgcm² | Large bevel gear inertia |
| $J_{sb}$ | 0.36 kgcm² | Small bevel gear inertia |
| $J_{os}$ | 1.09 kgcm² | Output shaft inertia |
| $J_{gh}$ | 0.0095 kgcm² | Gearhead inertia |
| $J_{ge}$ | 0.264 kgcm² | Generator rotor inertia |
| $r_b$ | 2 | Bevel gear transmission ratio |
| $r_g$ | 19 | Gearhead amplification ratio |
| $k_s$ | 37 kN/m | Coil spring stiffness |
| $n_p$ | 8 | Generator's number of pole pairs |
| $k_e$ | 0.072 V/rads | Generator voltage constant |
| $k_t$ | 0.072 Nm/A | Generator torque constant |
| $R_i$ | 0.12 Ohms | Generator phase resistance |

Three-Phase Generator Dynamic Model. In various embodiments, two generators 136 may be integrated into the energy harvesting tie 100 although other types and number of generators 136 may be employed. An induced phase voltage of a generator 136 connected with resistive loading may be employed. The power dissipated in the resistive loads can be considered as the electrical power output from the energy harvester 103.

Figure 13:
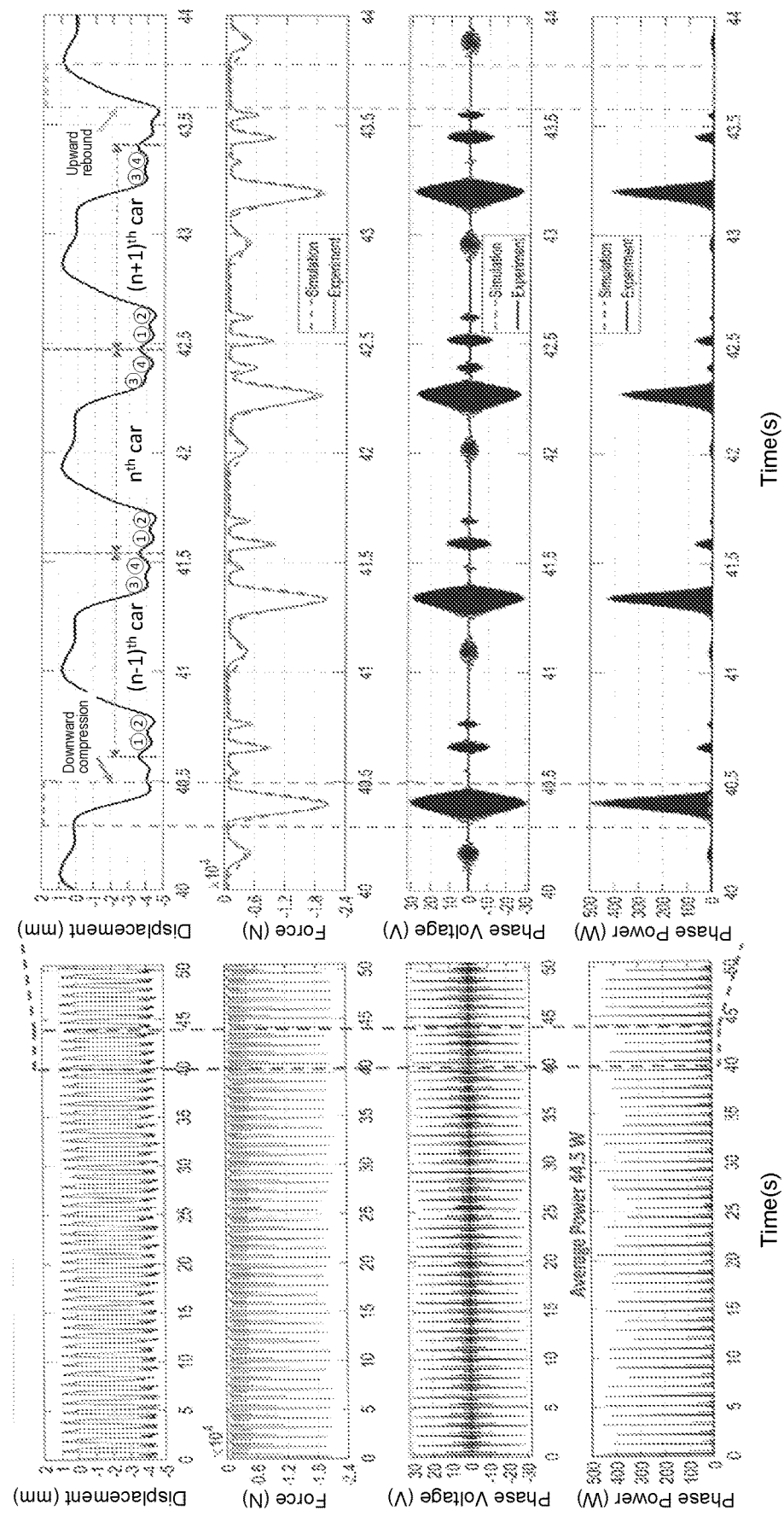
FIG. 13 includes a half-tie prototype laboratory testing results with field-measured tie displacement from a loaded freight train, with 2Ω resistive loading, where an average power of 44.5 W is achieved in three phases.

FIG. 13 shows the experimental results under the recorded tie displacement measurements with 2Ω resistive loads. This tie displacement was measured by a laser displacement sensor on the High Tonnage Loop (HTL) at the Transportation Technology Center (TTC) in Pueblo, Colo., with a loaded 27-car freight train at 64 km/h (40 mph) on a ballasted track. Using the recorded displacement as input to the energy harvesting tie 100 as disclosed in the embodiments herein yields an average power of 44.5 W in all three phases, demonstrating the energy harvesting tie 100 has an excellent capability to harvest tens-of-watt electrical power from a single rail.

The zoomed-in results between 40 and 44 sec in FIG. 13 clearly show how force, phase voltage, and power evolve with the field-recorded tie displacement excitation. The displacement valleys ①  through ④ on the zoom-in plot represent the maximum rail deflection/tie movement due to the 1st to 4th passing wheels of a car. The tie movement in compression is represented by decreasing displacements while increasing displacements denote rebound. As indicated, with 2Ω resistance, the system only harvests mechanical energy and generates electricity in the compression cycle. In rebound, the one-way clutch has been disengaged, and there is no electrical power output. Since the distance between the second and third wheel spans longer in a railcar, the energy harvesting tie 100 can fully rebound between the time it takes for the second and third wheels to pass over it. As noted above, the MMHR harvester only harvests energy in the compression cycle. Therefore, there is a large power output when the third wheel is approaching, but no power output after the second wheel leaves. Since the distance between any other two adjacent wheels is relatively short, the rail and tie cannot fully rebound to the unloaded height. This causes the next compression stroke to be fairly small. Therefore, the associated power peaks are much lower. The test results match well with the simulation estimates, validating the accuracy of the dynamic model. It is worth noting that the force is always negative, implying that the harvester resists compressive loads and offers little to no resistance in the rebound, in contrast to the related art that may require resisting both compressive and rebounding forces. In other words, with this MMHR mechanism, the energy harvesting tie 100 does not require a large spring resilience force for keeping the tie box stationary, thereby resolving the spring load and installation challenges of bidirectional harvesting.

Table 2 summarizes the average harvested power for various resistive loads for a single rail. Smaller resistive loads result in larger electrical damping. Therefore, more mechanical power can be transferred to electrical power from 8Ω to 2Ω. With all resistive loads, the output of the electromagnetic energy harvester 103 is more than 15 Watts, a significant increase over past harvesters. Through adjusting the resistive load, the power output can be adjusted to meet the power needs for different applications.

TABLE 2

| | Resistor | | |
| --- | --- | --- | --- |
| Speed | 8 Ω | 4 Ω | 2 Ω |
| 64 km/hr (40 mph) | 16.1 W | 27.7 W | 44.5 W |

The energy harvesting tie 100 is not only able to be implemented on the freight railroad for trackside electronics, but also it can be an alternative power source for metro tracks in tunnels where suitable electrical power is usually inaccessible. The earlier tests are repeated with field-recorded track displacement due to a metro train in order to measure the harvested power under light wheel loads, where less track deflection is expected. The measurements are from a two-car metro train traveling at 20 km/h (13 mph) and 30 km/h (19 mph). Each car has two two-axle bogies, for a total of eight wheelsets for the train, and the metro has the operator cabs and leading bogies on each railcar at the front and rear of the train.

Figure 14:
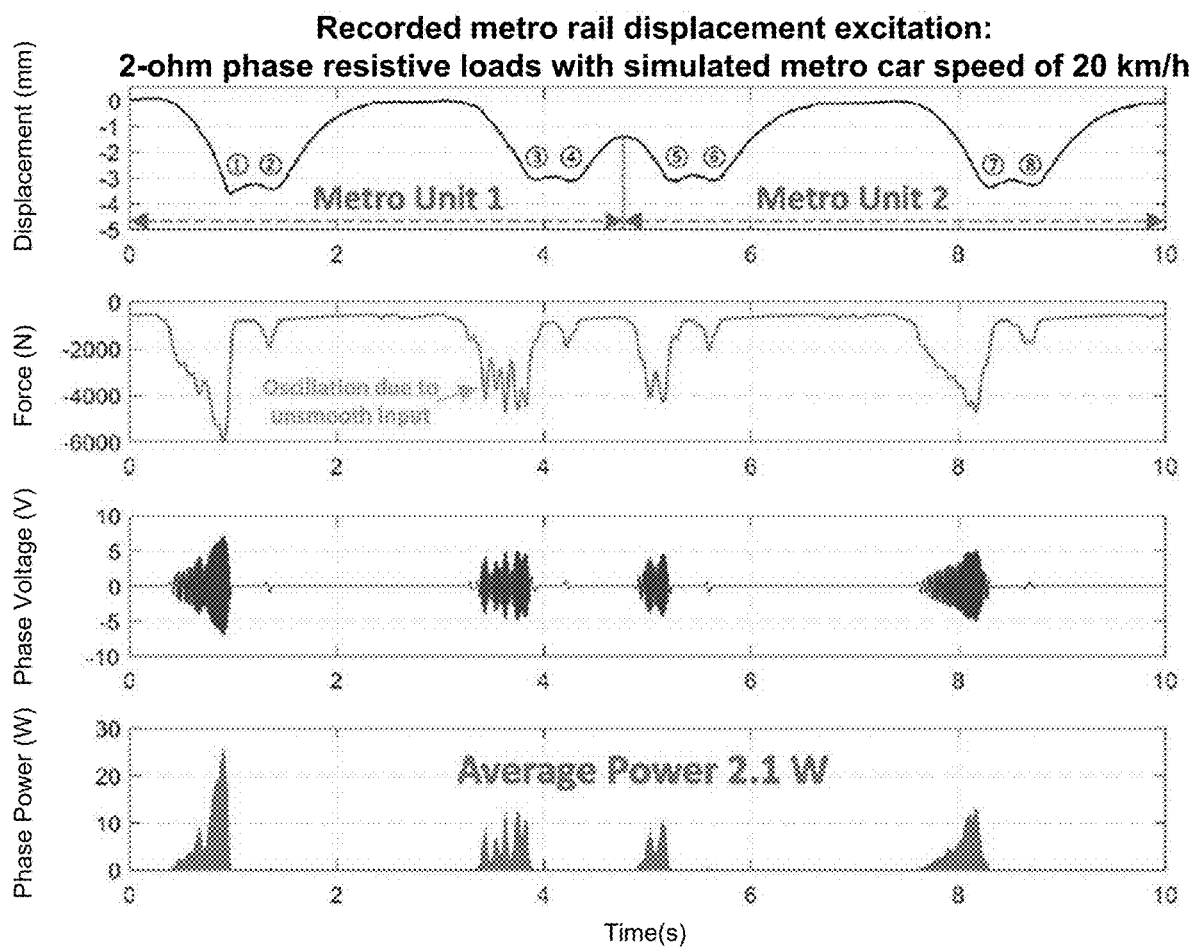
FIGS. 14 and 15 includes test results for the energy harvesting tie prototype with field-recorded metro rail displacements with 2Ω resistive loads, where an average power of 2.1 W is achieved at 20 km/h (13 mph) train speed and an average power of 6.1 W is achieved at 30 km/h (19 mph).
Figure 15:
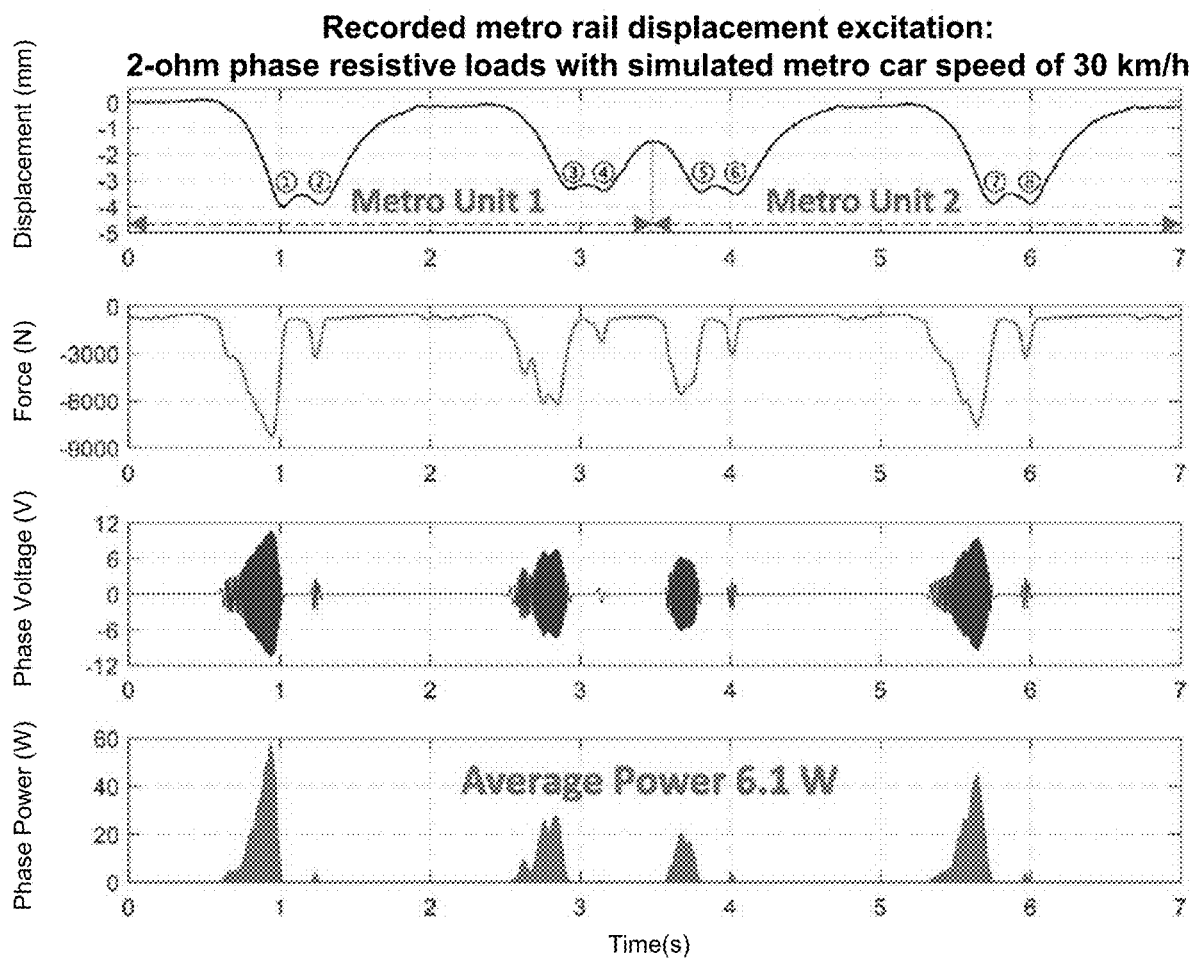

Experimental results under the recorded metro rail displacement with 2Ω resistive loads are shown in FIG. 14. The displacement valleys ①-⑧ represent maximum rail deflection under each passing wheel. The average power achieved is 2.1 W and 6.1 W for 20 km/h (13 mph) and 30 km/h (19 mph), respectively.

As noted earlier and also shown in the figure, the electromagnetic energy harvester 103 harvests power in compression and allows the track to rebound unimpeded. In this way, once the energy harvesting tie is installed on track, it is always supported by the ballast or subgrade underneath, eliminating the challenges of preload design and field installation. It is worth noting that for both simulated metro speeds, the first and last displacement valleys (i.e., ①-② and ⑦-⑧) are slightly higher than the others, and so are the corresponding force and generated power. This is because of the heavier wheel loads on the leading bogies on each car, with traction motors on the wheelsets. Besides, the force oscillations between 3.5 and 4 s in FIG. 14 are caused by the unsmooth track displacement measurement, resulting in a voltage/power oscillation while also showing that the system is sensitive enough to its input. It is estimated that the oscillations are caused by the wheel-rail interface.

Table 3 summarizes the average power harvested with field-recorded metro track displacements for various resistive loads. The average electrical power increases with decreasing resistive loading because a smaller resistive loading introduces larger electrical damping, resulting in more mechanical power being converted. The average power also increases at higher speeds due to larger rail deflection and excitation frequency. It is noted that the metro rail displacement amplitude and frequency are less than those of freight railroad because of smaller train loads and lower speeds so, therefore, the harvested average power for metro rail with the same resistive load is less. Although less electricity generated for metro rail compared with freight rail, a doubled average power output would be estimated for a full-size prototype installed on a metro track, which is good enough to power and charge a fair number of electronic devices for condition monitoring, wireless communication, and beyond. Furthermore, since the metro track input velocity is not high, more power output, if needed, is expected if the resistive load continues to be reduced below 2Ω.

TABLE 3

| Speed | Resistor 8 Ω | 4 Ω | 2 Ω |
| --- | --- | --- | --- |
| 20 km/hr (13 mph) | 0.6 W | 1.2 W | 2.1 W |
| 30 km/hr (19 mph) | 1.8 W | 3.3 W | 6.1 W |

Accordingly, an energy harvesting tie 100 with a ball screw based half-wave rectification mechanism is described and tested using sinusoidal and field-recorded track displacement measurements. Having similar dimensions to a conventional railroad tie, the energy harvesting tie 100 disclosed herein can be installed readily on a track and generate electricity with every passing wheel for powering trackside sensor suites and electrical devices. The integration into a composite tie protects the embedded energy harvesters 103 from harsh environments, maintenance of way equipment, and vandalism and theft, significantly improving reliability and functionality. Different from the existing bidirectional energy harvesters, the energy harvesting tie 100 with the mechanical motion half-wave rectification mechanism disclosed herein harvests track kinetic energy during its downward motion only and allows quick rebounding in the opposite direction, which releases the preload design constraints and leaves more room for design and performance improvement.

A simulation study was performed based on a nonlinear model of the electrical, electromagnetic, and mechanical components to better understand the system's dynamics and predict the performance. Experiments were carried out on a fabricated half-tie prototype with both sinusoidal and field-recorded track displacements to validate the model and assess the performance of power generation. The testing results well agree with the modeling predictions, and up to 78.1% mechanical efficiency was achieved with sinusoidal excitations. Field-recorded track displacement tests demonstrated that the fabricated half-tie prototype is able to generate 16.1-44.5 W of average power from a single freight rail at 64 km/h (40 mph), and a full-size prototype is expected to double the power generation.

The experiments validated that the system passed a limited amount of life cycle testing in the lab and can respond well to the low-frequency movement of the rail due to passing wheel loads. As such, the energy harvesting tie 100 is capable of powering various trackside electronics effectively and efficiently and has great potential to improve rail safety and connectivity by bringing more intelligence to the railroad.

While various embodiments described herein relate to operation of an energy harvesting device is an energy harvesting railroad tie 100, the disclosure is not so limited. It is understood that the principals of the embodiments described herein may be employed in various surfaces, such as roads, walking paths, bridges, and the like. As such, any force applied to a surface in a first direction (e.g., a vertical direction) may be translated to a second direction to drive a generator 136 and produce electrical energy.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. If a component is described as having "one or more" of the component, it is understood that the component can be referred to as "at least one" component.

The terms "first," "second," etc. are used only as labels, rather than a limitation for a number of the objects. It is understood that if multiple components are shown, the components may be referred to as a "first" component, a "second" component, and so forth, to the extent applicable.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

The above-described embodiments of the present disclosure are merely possible examples of implementations set forth for a clear understanding of the principles of the disclosure. Many variations and modifications may be made to the above-described embodiment(s) without departing Therefore, the following is claimed:

1. An energy harvesting device implementing a half-wave mechanical motion rectification (HMMR) mechanism, comprising:
   a housing configured to be coupled to a surface, comprising:
      at least one spring; and
      at least one energy harvester comprising a generator and means for translating force applied to the surface in a first direction to force in a second direction, wherein:
   under a force applied to the surface, the at least one energy harvester is compressed, and a compression of the at least one energy harvester causes the means for translating force to drive the generator to generate electrical power;
   when the force applied to the surface has dissipated, the at least one spring causes the energy harvesting device to return to an undeflected state and the generator to disconnect from the means for translating the force;
   the surface is a first rail and a second rail;
   the energy harvesting device is disposed below the first rail and the second rail;
   the at least one energy harvester comprises a first energy harvester disposed at a first side of the energy harvesting device and a second energy harvester disposed at a second side of the energy harvesting device, the first energy harvester is configured to harvest kinetic energy from the first rail and the second energy harvester is configured to harvest kinetic energy from the second rail; and
   the at least one spring is a plurality of springs.

2. The energy harvesting device according to claim 1, wherein a number of the plurality of springs is at least two.

3. The energy harvesting device according to claim 1, wherein:
   the means for translating the force comprises an output shaft, a gearhead, a ball screw, and a one-way clutch;
   the compressing of the at least one energy harvester causes a rotation of the ball screw or other motion transmission, a rotation of the output shaft, and a transmission of torque to a shaft of the gearhead, driving the generator to generate the electrical power via the one-way clutch; and
   the one-way clutch is an only one-way clutch of the at least one energy harvester.

4. The energy harvesting device according to claim 1, further comprising a battery electrically coupled to the at least one energy harvester, the at least one energy harvester being configured to charge the battery when the force is applied to the surface.

5. The energy harvesting device according to claim 1, wherein the at least one energy harvester is rigidly connected to the energy harvesting tie at a top of the at least one energy harvester and a tie box at a bottom of the at least one energy harvester.

6. The energy harvesting device according to claim 1, further comprising processing circuitry configured to generate at least one measurement associated with the surface, and communicate the at least one measurement or store the at least one measurement in a storage device.

7. The energy harvesting device according to claim 1, further comprising processing circuitry configured to generate at least one measurement associated with the first rail and the second rail, and communicate the at least one measurement or store the at least one measurement in a storage device.

8. A method for generating electrical power using a half-wave mechanical motion rectification (HMMR) mechanism, comprising:
   providing an energy harvesting device;
   coupling the energy harvesting device to a surface;
   under a force applied to the surface, compressing the energy harvesting device, wherein the compressing of the energy harvesting device causes a generator to generate electrical power; and
   when the force applied to the surface has dissipated, returning the energy harvesting device to a non-compressed state in which the generator does not generate electrical power as assisted by energy stored in at least one spring, wherein:
   the surface is a first rail and a second rail;
   the energy harvesting device is disposed below or within an energy harvesting railroad tie;
   the energy harvesting device comprises a first energy harvester disposed at a first side of the energy harvesting railroad tie and a second energy harvester disposed at a second side of the energy harvesting railroad tie, the first energy harvester is configured to harvest kinetic energy from the first rail and the second energy harvester is configured to harvest kinetic energy from the second rail; and
   the at least one spring is a plurality of springs.

9. The method according to claim 8, wherein a number of the plurality of springs is at least two.

10. The method according to claim 8, wherein:
   the energy harvesting device comprises an output shaft, a gearhead, a ball screw, and a one-way clutch;
   the compressing of the energy harvesting device causes a rotation of the ball screw or other motion transmission, a rotation of the output shaft, and a transmission of torque to a shaft of the gearhead, driving the generator to generate the electrical power via the one-way clutch; and
   the one-way clutch is an only one-way clutch of the at least one energy harvester.

11. The method according to claim 8, further comprising charging a battery electrically coupled to the at least one energy harvester when the surface is under compression.

12. The method according to claim 8, wherein the energy harvesting device is rigidly connected to the energy harvesting railroad tie at a top of the energy harvesting device and to a tie box at a bottom of the energy harvesting device.

13. The method according to claim 8, further comprising powering processing circuitry that generates at least one measurement associated with the surface, and communicating the at least one measurement or storing the at least one measurement in a storage device.

14. An energy harvesting railroad tie implementing a half-wave mechanical motion rectification (HMMR) mechanism, comprising:
   a tie housing configured to be coupled to a first rail and a second rail, comprising:
      at least one spring; and
      a first energy harvester and a second energy harvester, each comprising a generator having an output shaft, a gearhead, a ball screw, and a one-way clutch;

wherein, under a force of passing wheels on the first rail and the second rail, the first and second energy harvesters are compressed, wherein a compression of the first and second energy harvesters causes a rotation of the ball screw or other motion transmission, a rotation of the output shaft, and a transmission of torque to a shaft of the gearhead, driving the generator to generate electrical power via the one-way clutch; and wherein, when the force of the passing wheel on the first rail and the second rail has dissipated, the at least one spring causes the energy harvesting railroad tie to return to an undeflected state, causing the ball screw or other motion transmission and output shaft of the first and second energy harvester to rotate, the one-way clutch to disengage from the output shaft, and disconnect the generator from the gearhead.

15. The energy harvesting railroad tie according to claim 14, wherein:
the first energy harvester is disposed at a first side of the energy harvesting railroad tie; and
the second energy harvester is disposed at a second side of the energy harvesting railroad tie.

16. The energy harvesting railroad tie according to claim 14, wherein the one-way clutch is an only one-way clutch of the first and second energy harvesters.

17. The energy harvesting railroad tie according to claim 14, further comprising a battery electrically coupled to the first and second energy harvesters, the first and second energy harvester being configured to charge the battery when the first rail and the second rail are under compression.

18. The energy harvesting railroad tie according to claim 14, wherein at least one of the first and second energy harvesters is rigidly connected to the energy harvesting tie at a top of the first and second energy harvesters and a tie box at a bottom of the first and second energy harvesters.

* * * * *